United States Patent
Kim et al.

(10) Patent No.: US 10,981,529 B2
(45) Date of Patent: Apr. 20, 2021

(54) ENERGY ABSORPTION DEVICE FOR AN OCCUPANT IN VEHICLE SEAT

(71) Applicant: GM Global Technology Operations LLC, Detroit, MI (US)

(72) Inventors: Jason Kim, Auburn Hills, MI (US); Anna M. Lusk, Lake Orion, MI (US); Brian J. Putala, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 16/409,331

(22) Filed: May 10, 2019

(65) Prior Publication Data

US 2020/0353885 A1 Nov. 12, 2020

(51) Int. Cl.
| | |
|---|---|
| *B60R 21/015* | (2006.01) |
| *B60N 2/42* | (2006.01) |
| *B60N 2/64* | (2006.01) |
| *B60R 21/207* | (2006.01) |
| *B60R 21/01* | (2006.01) |
| *B60R 21/00* | (2006.01) |

(52) U.S. Cl.
CPC ...... *B60R 21/01554* (2014.10); *B60N 2/4249* (2013.01); *B60N 2/64* (2013.01); *B60R 21/207* (2013.01); *B60R 2021/0004* (2013.01); *B60R 2021/0006* (2013.01); *B60R 2021/0009* (2013.01); *B60R 2021/01013* (2013.01); *B60R 2021/01211* (2013.01)

(58) Field of Classification Search
CPC ............ B60R 21/01554; B60R 21/207; B60R 2021/01013; B60R 2021/01211; B60R 2021/0009; B60R 2021/0006; B60R 2021/0004; B60N 2/64; B60N 2/4249
See application file for complete search history.

(56) References Cited

U.S. PATENT DOCUMENTS

| | | | |
|---|---|---|---|
| 2006/0214400 A1* | 9/2006 | Enders | B60R 21/231 280/730.1 |
| 2019/0016294 A1* | 1/2019 | Hayashi | B60R 21/233 |
| 2019/0111877 A1* | 4/2019 | Line | B60R 21/233 |
| 2019/0111880 A1* | 4/2019 | Choi | B60R 21/2338 |
| 2020/0122674 A1* | 4/2020 | Chen | B60R 21/207 |
| 2020/0122676 A1* | 4/2020 | Sekizuka | B60N 2/4279 |
| 2020/0262378 A1* | 8/2020 | Alarcon Hernandez | B60R 21/0132 |
| 2020/0331419 A1* | 10/2020 | Jost | B60R 21/0136 |

* cited by examiner

*Primary Examiner* — Drew J Brown (57) ABSTRACT

A restraint system for a vehicle is disclosed. The restraint system includes a seat shaped to accommodate an occupant, wherein the seat includes a seat back and an energy absorption member that expands from a stowed position and into a deployed position. The energy absorption member fills a volume of space behind the seat back when in the deployed position to absorb energy that would otherwise be imparted towards an occupant of the seat during an impact involving the vehicle. The restraint system also includes an impact sensing device generating an impact signal in response to detecting the impact involving the vehicle is imminent. The impact signal indicates an orientation and magnitude of the impact involving the vehicle. The restraint system includes a control module in electronic communication with the energy absorption member and the impact sensing device.

19 Claims, 8 Drawing Sheets

ENERGY ABSORPTION DEVICE FOR AN OCCUPANT IN VEHICLE SEAT

INTRODUCTION

The present disclosure relates to energy absorption members for a vehicle. More specifically, the present disclosure relates to an energy absorption member stored along the back of a vehicle seat, where the energy absorption member is expanded into a deployed position to absorb energy that would otherwise be imparted towards an occupant in the vehicle seat and control kinematics of a seated occupant during a collision.

Some autonomous vehicles require very limited passenger interaction to operate. For example, in some instances, an autonomous vehicle may only require a passenger to indicate his or her destination. As a result, autonomous vehicles may not require components that an individual typically uses to maneuver the vehicle such as, for example, a steering wheel. Moreover, the passenger who is normally seated in the driver's seat may no longer need to be facing forwards towards the front windshield. This is because the occupant seated in the driver's seat no longer needs to view the roadways. As a result, some autonomous vehicles may have flexible seating configurations that allow for the front passengers to rotate their seats into a rearward facing orientation or a side-facing orientation.

Some types of airbags that are commonly found in an automobile include frontal airbags, side airbags, and knee airbags. Frontal airbags are mounted in the steering wheel and the front instrument panel or bulkhead to accommodate the driver and the front passenger. However, frontal airbags may not always accommodate passengers who are not oriented in the forward-facing position.

Thus, while current airbags achieve their intended purpose, there is a need for a new and improved airbag that accommodates front passengers who are oriented in the rearward facing or side-facing position in a vehicle.

SUMMARY

According to several aspects, a restraint system for a vehicle is disclosed. The restraint system includes a seat shaped to accommodate an occupant, wherein the seat includes a seat back and an energy absorption member that expands from a stowed position and into a deployed position. The energy absorption member fills a volume of space behind the seat back when in the deployed position to absorb energy that would otherwise be imparted towards an occupant of the seat during an impact involving the vehicle. The restraint system also includes an impact sensing device generating an impact signal in response to detecting the impact involving the vehicle is imminent. The impact signal indicates an orientation and magnitude of the impact involving the vehicle. The restraint system includes a control module in electronic communication with the energy absorption member and the impact sensing device. The control module executes instructions to receive the impact signal and determine that the energy absorption member is to expand based on the orientation and magnitude of the impact involving the vehicle. The control module also instructs the energy absorption member to expand into the deployed position.

In another aspect, the seat is moveable between a plurality of orientations that include a forward-facing orientation, a side-facing orientation, and a rearward facing orientation.

In another aspect, the plurality of orientations of the seat include a plurality of angular orientations that are each located incrementally between the forward-facing orientation and the rearward facing orientation.

In still another aspect, the system comprises a seating position detector generating a seat signal indicating a selected orientation of the seat, and where the control module is in electronic communication with the seating position detector.

In yet another aspect, the orientation of the impact involving the vehicle is one of a front impact, rear impact, a side impact, and an angular impact.

In another aspect, the control module executes instructions to determine the orientation and the magnitude of the impact involving the vehicle based on the impact signal, determine a specific orientation of the seat based on the seat signal, and in response to determining the orientation and the magnitude of the impact involving the vehicle and the specific orientation of the seat, determine the energy absorption member remains in the stowed position.

In yet another aspect, the control module executes instructions to determine a specific orientation of the seat is a selected angled orientation of the plurality of angular orientations that are each located incrementally between the forward-facing orientation and the rearward facing orientation, and in response to determining the specific orientation of the seat is the selected angled orientation, determine the energy absorption member expands into the deployed position in response to receiving the impact signal.

In yet another aspect, an expansion device operably connected to the energy absorption member, where the expansion device expands the energy absorption member from the stowed position into the deployed position.

In still another aspect, the energy absorption member is an airbag.

In another aspect, the expansion device is inflation device that generates gas at a predefined volumetric flow rate to inflate the airbag from the stowed position shown in and into the deployed position.

In yet another aspect, the energy absorption member is a compressible energy absorption material that supports force deflection up to about 35 kilonewtons.

In still another aspect, the energy absorption member includes one of the following: one or more tethers and one or more vents.

In another aspect, the seat includes a seat shell and a seat back cushion, and where the energy absorption member is disposed between the seat shell and the seat back cushion.

In an aspect, a vehicle is disclosed, and includes a seat shaped to accommodate an occupant, where the seat includes a seat back, and wherein the seat is moveable between a plurality of orientations that include a forward-facing orientation, a side-facing orientation, and a rearward facing orientation. The vehicle also includes an energy absorption member that expands from a stowed position and into a deployed position. The energy absorption member fills a volume of space behind the seat back when in the deployed position to absorb energy that would otherwise be imparted towards the seat during an impact involving the vehicle. The vehicle also includes an impact sensing device generating an impact signal in response to detecting the impact involving the vehicle is imminent. The impact signal indicates an orientation and magnitude of the impact involving the vehicle. The vehicle also includes a seating position detector generating a seat signal indicating a selected orientation of the seat and a control module in electronic communication with the energy absorption member, the seating position detector, and the impact sensing device. The control module executes instructions to receive the impact signal and determine the orientation and the magnitude of the impact involving the vehicle based on the impact signal. The control module also executes instructions to determine a specific orientation of the seat based on the seat signal. In response to determining the orientation and magnitude of the impact involving the vehicle and the specific orientation of the seat, instruct the energy absorption member to expand into the deployed position.

In another aspect, the orientation of the impact involving the vehicle is one of a front impact, rear impact, a side impact, and an angular impact.

In yet another aspect, the control module executes instructions to determine the orientation and the magnitude of the impact involving the vehicle based on the impact signal, determine a specific orientation of the seat based on the seat signal, and in response to determining the orientation and the magnitude of the impact involving the vehicle and the specific orientation of the seat, determine the energy absorption member remains in the stowed position.

In still another aspect, the control module executes instructions to determine a specific orientation of the seat is a selected angled orientation of the plurality of angular orientations that are each located incrementally between the forward-facing orientation and the rearward facing orientation, and in response to determining the specific orientation of the seat is the selected angled orientation, determine the energy absorption member expands into the deployed position in response to receiving the impact signal.

In yet another aspect, the energy absorption member is an airbag.

In another aspect, the energy absorption member is a compressible energy absorption material that supports force deflection up to about 35 kilonewtons.

In yet another aspect, the seat includes a seat shell and a seat back cushion, and wherein the energy absorption member is disposed between the seat shell and the seat back cushion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
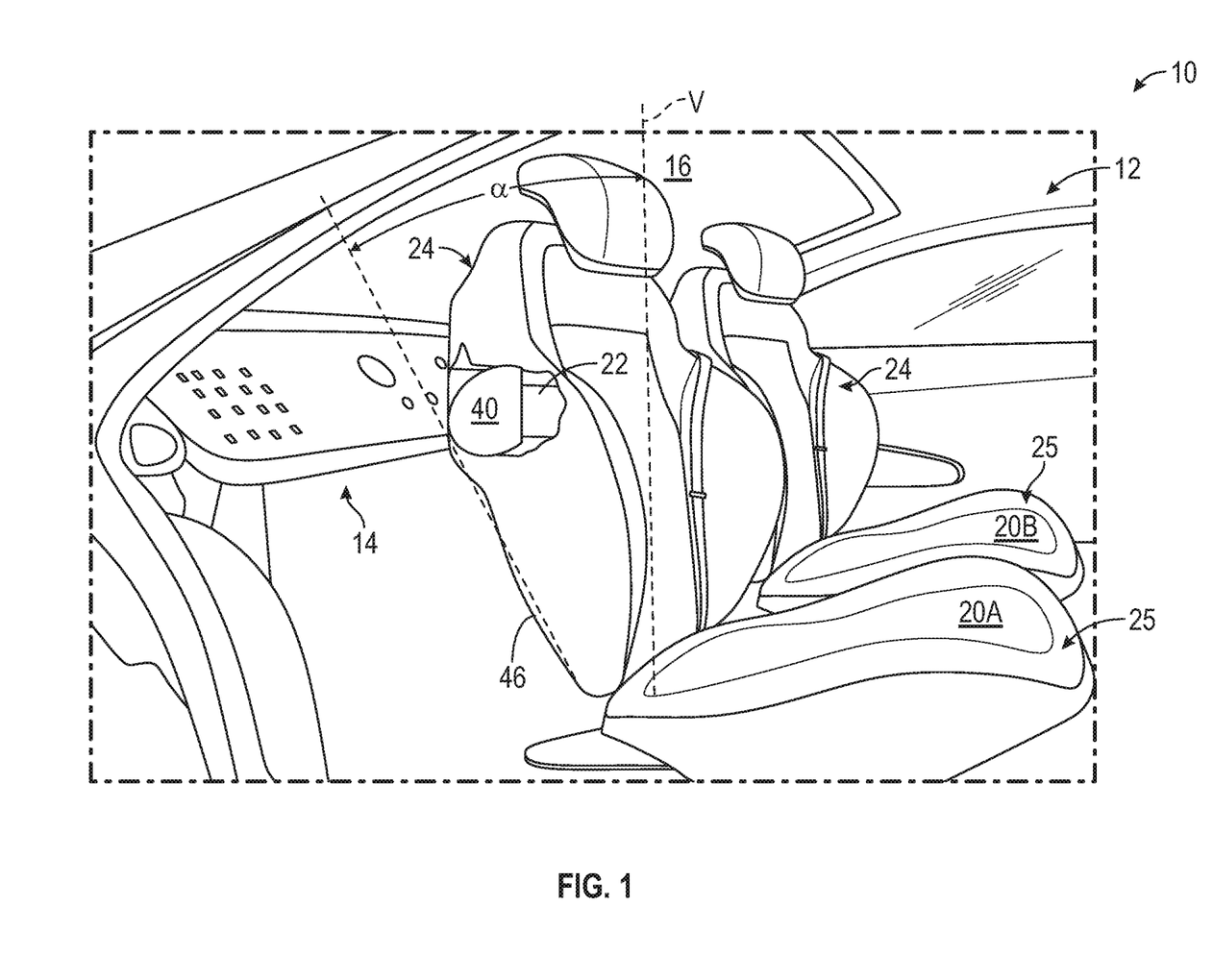
FIG. 1 illustrates a vehicle including a restraint system for a seat, where an energy absorption member is in a stowed position according to an exemplary embodiment.

Referring to FIG. 1, an interior cabin 12 of an exemplary vehicle 10 is illustrated. The interior cabin 12 includes an instrument panel or bulkhead 14, a front windshield 16, and a plurality of seats 20. Each seat 20 is shaped to accommodate an occupant. The vehicle 10 is any type of motor vehicle such as, but not limited to, a passenger car such as a sedan, a truck, van, a multi-purpose vehicle, or a sport-utility vehicle. In the embodiment as shown, the seats 20 include two rearward facing front seats 20A and 20B. Specifically, in one non-limiting embodiment, the front left hand seat may be referred to as the driver's side seat 20A and a front right hand seat may be referred to as the passenger's side seat 20B. However, it is to be appreciated that the front left hand seat is not always the driver's seat in a vehicle depending upon the area or country where a vehicle is located. The seats 20A, 20B each include a respective seat back 24 and a seat bottom 25. The driver's side seat 20A is shown having an energy absorption module 22 located along the seat back 24 of the driver's side seat 20A. Although the energy absorption module 22 is shown within the seat 20, it is to be appreciated that the energy absorption module 22 may be located outside of the seat 20 as well. Although FIG. 1 illustrates the seat energy absorption module 22 as part of the driver's side seat 20A, it is to be appreciated that the energy absorption module 22 is applicable to the passenger's side seat 20B as well. The energy absorption module 22 may also be applied to any of the other seats 20 within the vehicle 10 as well. As described below, the energy absorption module 22 includes an energy absorption member 40 that is configured to expand from the stowed position as seen in FIG. 1 and into a deployed position shown in FIG. 2. The energy absorption member 40 expands along a deployment path.

Figure 2:
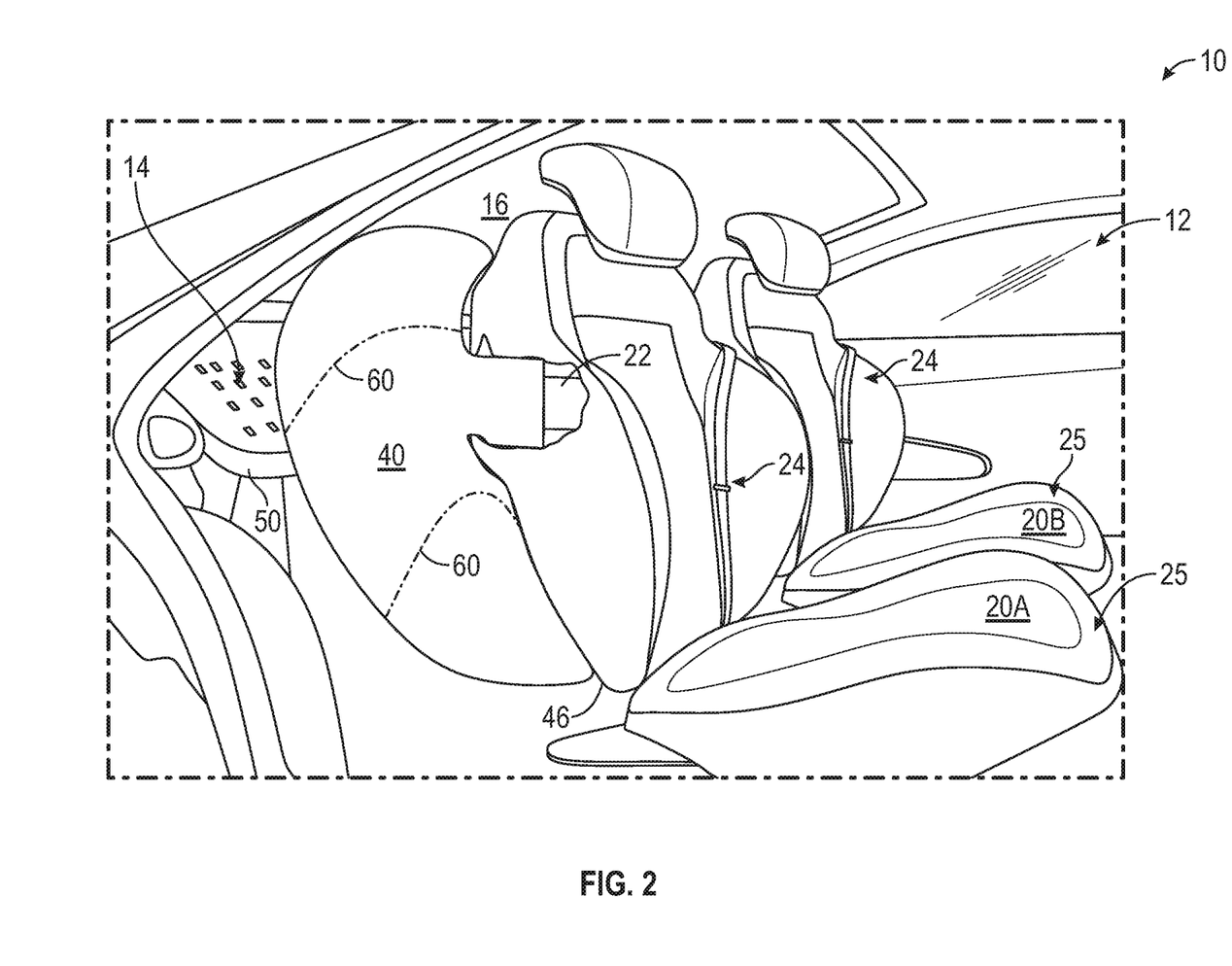
FIG. 2 illustrates the seat in FIG. 1, where the energy absorption member is expanded into a deployed position according to an exemplary embodiment.
Figure 6A:
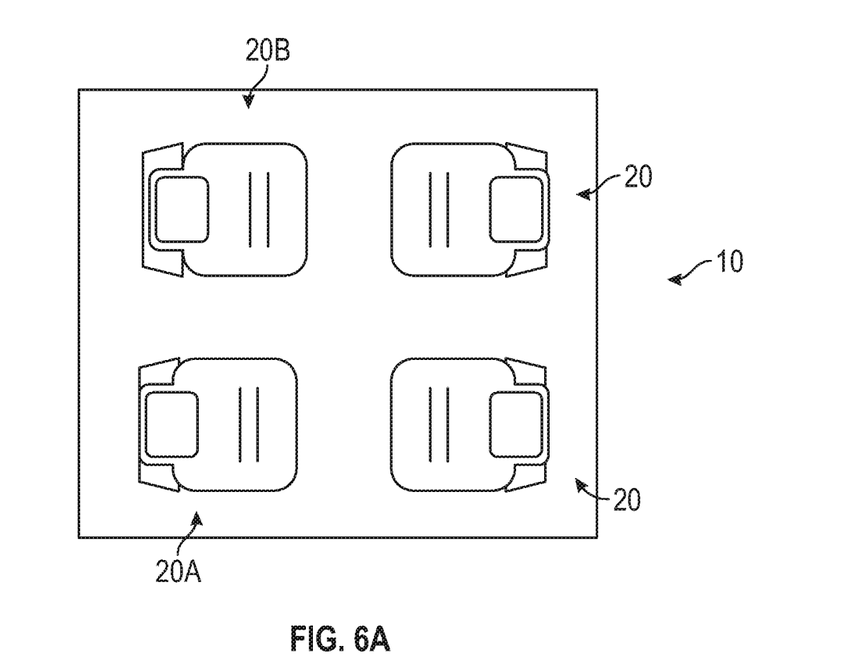
FIGS. 6A-6D Illustrate an exemplary carriage seating arrangement for a vehicle, where a driver's side seat is rotated into various positions according to an exemplary embodiment.
Figure 6B:
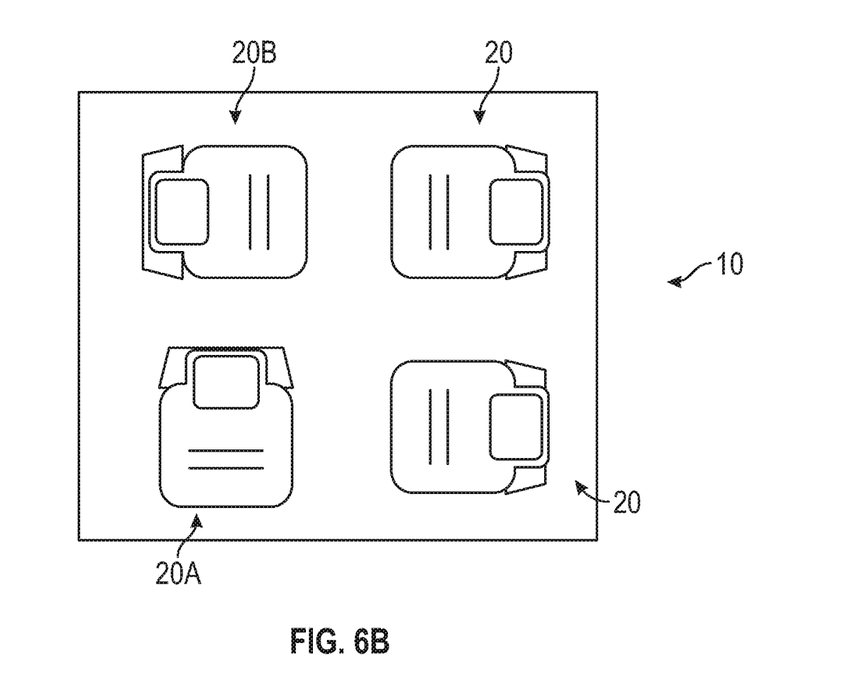
Figure 6C:
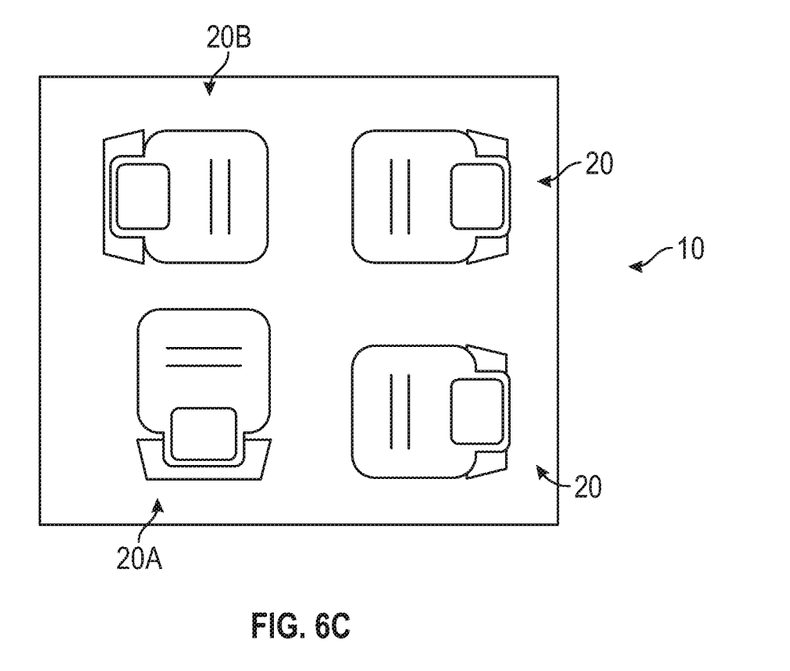
Figure 6D:
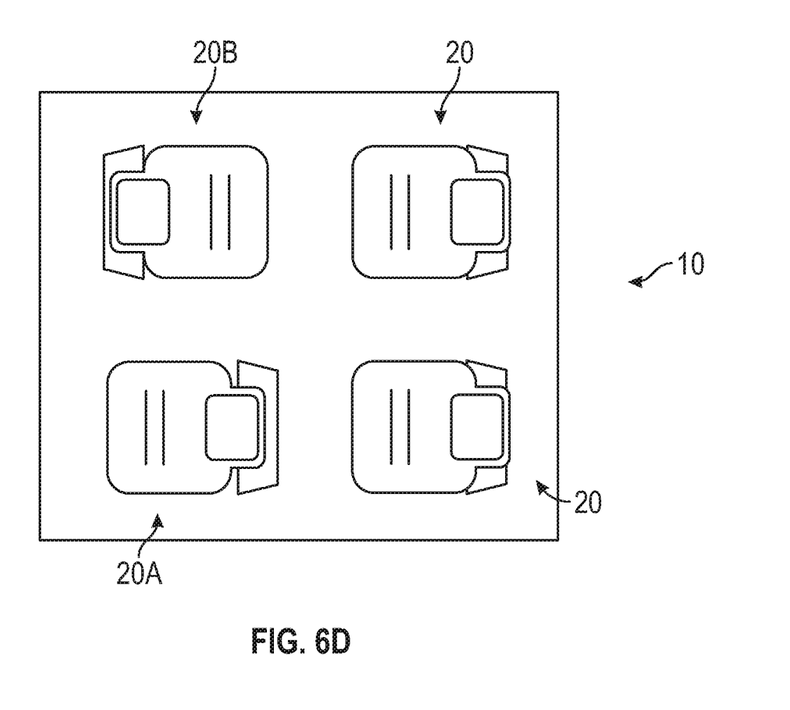

In the embodiment as shown in FIGS. 1 and 2, the vehicle 10 is an autonomous vehicle. Therefore, components that allow for an individual to manipulate a vehicle such as, for example, a steering wheel, are absent from the interior cabin 12 of the vehicle 10. Accordingly, the driver's side seat 20A does not need to face the front windshield 16 so that a driver may view a roadway while operating the vehicle 10. Although the figures illustrate an autonomous vehicle, it is to be appreciated that the vehicle 10 may be a non-autonomous vehicle that is manipulated by an individual as well. In one embodiment, both the seats 20 may be rotatable or moveable into a plurality of orientations relative to the vehicle 10. Namely, in one embodiment, the seats 20 are moveable between a forward-facing orientation, a side-facing orientation, and a rearward facing orientation. For example, FIG. 6A illustrates the driver's side seat in the rearward facing orientation, FIG. 6B illustrates the driver's side seat in a side-facing position, where the driver's side seat 20A is facing an outboard side of the vehicle 10. FIG. 6C illustrates the driver's side seat in another side-facing orientation towards in inboard side of the vehicle 10. Finally, FIG. 6D illustrates the driver's side seat 20A in the forward-facing position.

Figure 7A:
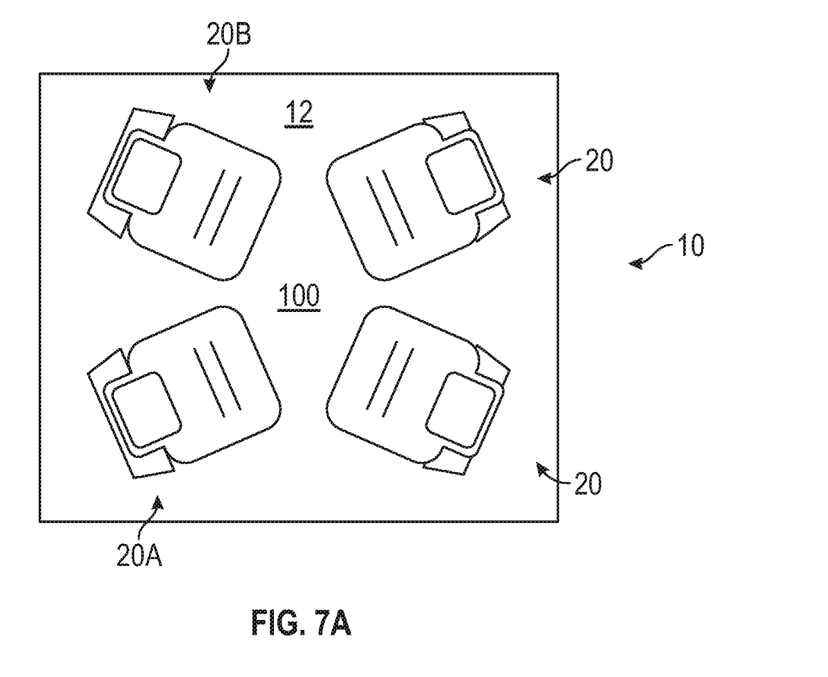
FIGS. 7A-7D illustrate an exemplary campfire seating arrangement for a vehicle, where the driver's side seat is rotated into various positions according to an exemplary embodiment.
Figure 7B:
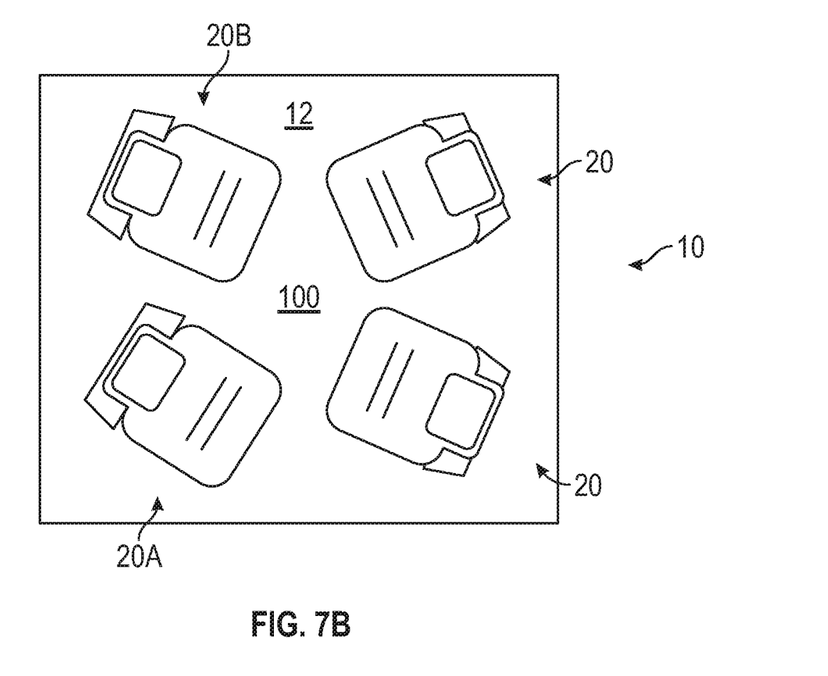
Figure 7C:
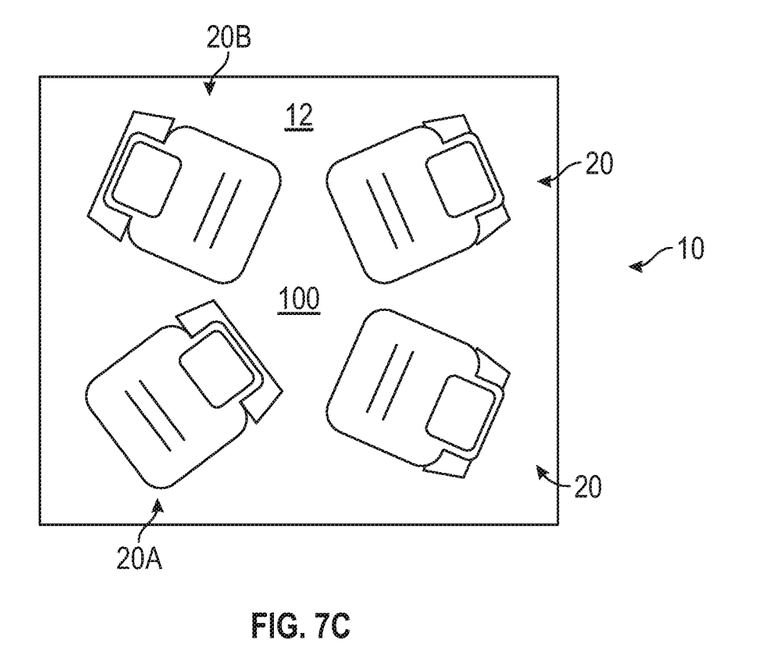
Figure 7D:
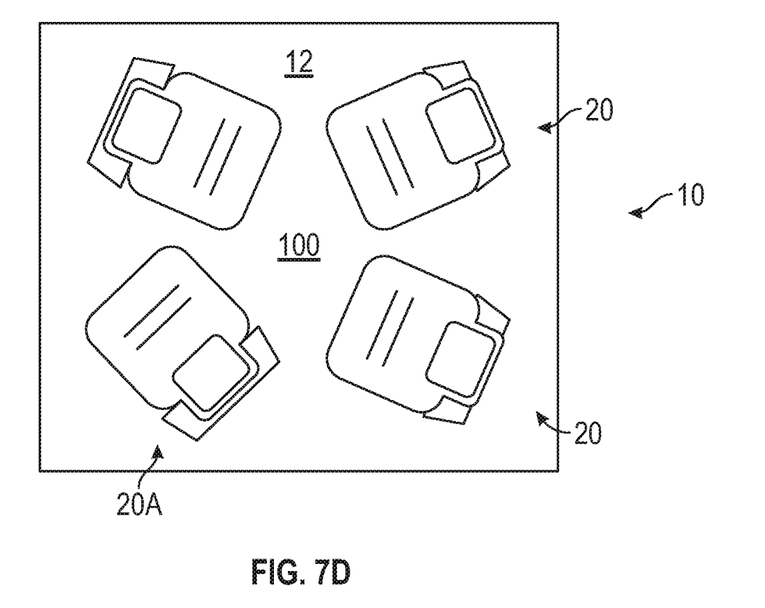

In one embodiment, the orientation of the seats 20 may also include plurality of angular orientations that are each located incrementally between the forward-facing orientation and the rearward facing orientation. For example, FIGS. 7A-7D illustrate a campfire style (or a carriage style) seating arrangement of the vehicle 10. A campfire style seating arrangement include seats 20 that are each rotatable towards a center area 100 of the interior cabin 12. For example, in the embodiment as shown in FIG. 7A, the driver's side seat 20A is angled about thirty degrees inboard from the rearward facing orientation. In the embodiment as shown in FIG. 7B, the driver's side seat 20A is angled about thirty degrees outboard from the rearward facing orientation. FIG. 7C illustrates the driver's side seat 20A rotated about thirty degrees outboard from the forward-facing orientation, and FIG. 7D illustrates the driver's side seat angles about thirty degrees inboard from the forward-facing orientation.

Figure 3:
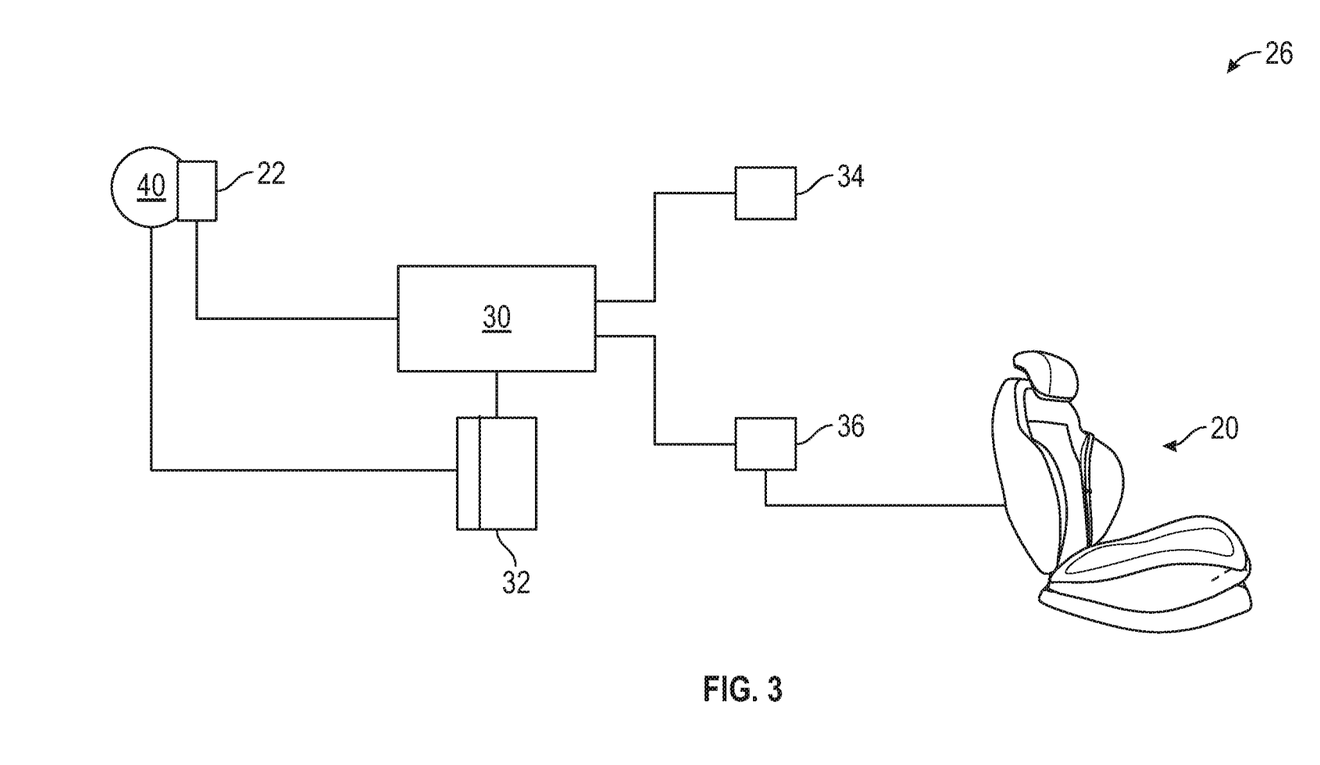
FIG. 3 is a schematic diagram of the restraint system shown in FIGS. 1 and 2 according to an exemplary embodiment.

FIG. 3 is a schematic diagram of a restraint system 26 for the vehicle 10. Referring to FIGS. 1 and 3, the restraint system 26 includes the energy absorption module 22, a control module 30, an expansion device 32, an impact sensing device 34, and a seating position detector 36. The energy absorption module 22 includes the energy absorption member 40, which is configured to expand into the deployed position as the control module 30 detects an impact involving the vehicle 10. It is to be appreciated that the control module 30 detects an impact either as the vehicle 10 is presently undergoing an impact or when an impact is imminent. It is to be appreciated that the expansion device 32, the seating position detector 36, and the energy absorption member 40 may be placed in various locations within the vehicle 10 and may be placed either within or outside of a respective seat 20. In the embodiment as shown in FIGS. 1 and 2, the energy absorption member 40 is an airbag that inflates into the deployed position. However, it is to be appreciated that in an alternative example the energy absorption member 40 is a compressible energy absorption material that expands into the deployed position. The compressible energy absorption material is described in greater detail below.

When in the deployed position shown in FIG. 2, the energy absorption member 40 absorbs energy that would otherwise be imparted towards an occupant of the seat 20 during an impact involving the vehicle 10, and controls occupant kinematics of the occupant in the seat 20 during the impact. Specifically, when in the deployed position, the energy absorption member 40 fills a volume of space behind the seat back 24, which in turn absorbs energy that would otherwise be imparted towards the occupant of the seat 20 during an impact involving the vehicle 10.

A specific amount of volume of space occupied by the energy absorption member 40 in the deployed position is based on an orientation of the seat 20. That is, the specific amount of volume of space the energy absorption member 40 is based the seat 20 being oriented in the rearward facing direction, the side-facing orientation, one of the angular orientations, or the forward-facing orientation. For example, if the seats 20 are oriented in the rearward facing orientation as shown in FIGS. 1 and 2, then the energy absorption member 40 absorbs energy that would otherwise be imparted towards an occupant in the fore-aft direction of the vehicle 10. Likewise, if the seat 20 is oriented in the forward-facing orientation, then the energy absorption member 40 absorbs energy in the fore-aft direction as well. If the seat 20 is in the side-facing orientation, then the energy absorption member 40 is configured to absorb energy that would otherwise be imparted towards an occupant in a side-to-side direction of the vehicle 10. Similarly, if the seat 20 is oriented in an angular position, then the energy absorption member 40 is configured to absorb energy that would otherwise be imparted towards the occupant in the angular direction. In one embodiment, the energy absorption member 40 may also be used to absorb energy in an impact if the respective seat 20 is a front seat that is in the forward-facing orientation, an angular position, or a rearward facing orientation and if there are rear occupants.

Referring to both FIGS. 1 and 3, the control module 30 is in electronic communication with the energy absorption module 22, the expansion device 32, the impact sensing device 34, and the seating position detector 36. Specifically, the control module 30 provides control and actuation to the energy absorption module 22 and the expansion device 32. The control module 30 is an electronic control device having a preprogrammed digital computer or processor, control logic or circuits, memory used to store data, and at least one I/O peripheral. The control logic includes or enables a plurality of logic routines for monitoring, manipulating, and generating data and control signals. As explained below, the control module 30 executes instructions to cause the energy absorption member 40 to expand from the stowed position (FIG. 1) and into the deployed position (FIG. 2). The control module 30 may also determine the shape, depth, and stiffness of the energy absorption member 40 based on occupant size, severity of the impact, the orientation and magnitude of the impact, and the specific orientation of the seat 20.

Referring to FIGS. 1-3, the expansion device 32 is operably connected to the energy absorption member 40 and is configured to expand the energy absorption member 40 from the stowed position seen in FIG. 1 and into the deployed position seen in FIG. 2 in response to receiving an activation signal from the control module 30. Specifically, the expansion device 32 is in operable communication with the energy absorption member 40 and expands the energy absorption member 40 into the deployed position. For example, if the energy absorption member 40 is an airbag, then the expansion device 32 is an inflation device that generates gas at a predefined volumetric flow rate to inflate the airbag from the stowed position shown in FIG. 1 and into the deployed position as shown in FIG. 2. Alternatively, if the energy absorption member 40 is a compressed energy absorption material, then the expansion device 32 may be an inflator, micro gas generator, or part of the energy absorption material itself, where the expansion device 32 is configured to grow or expand the energy absorption material rapidly into the deployed position. For example, the expansion device 32 may be an inflator combined with a micro gas generator and a material configured for rapid expansion.

The impact sensing device 34 generates an impact signal that is sent to the control module 30. The impact signal indicates an impact involving the vehicle 10 is imminent. In other words, the impact signal indicates the vehicle 10 is undergoing or is about to undergo a collision. The impact signal indicates the orientation and magnitude of the impact. The orientation is also referred to as the type of the impact that the vehicle 10 undergoes. Specifically, the type of impact is a front or rear impact, a side impact, or an angular impact. In one non-limiting embodiment, the impact sensing device 34 may be an impact sensor. Alternatively, in another embodiment the impact sensing device 34 may be part of a pre-crash system. For example, the impact sensing device 34 may be a camera, a radar, or a light detection and ranging (LIDAR) based device that is part of a pre-crash system.

The seating position detector 36 generates a seat signal indicates the orientation and articulate angle of a corresponding seat 20. The seating position detector 36 may be a seat sensor or, alternatively other occupant detection devices such as cameras and weight sensors. The orientation of the seat 20 refers to one of a forward-facing, a side-facing, a rearward facing, or an angular orientation of the seat 20. The angular orientation of the seat 20 also indicates the specific angle that the seat 20 is oriented at relative to the forward-facing orientation and the rearward facing orientation. Referring specifically to FIG. 1, the articulate angle of the seat 20 refers to an angle α measured between the seat back 24 relative to a vertical line V (i.e., an imaginary line that is perpendicular to earth). When an occupant articulates a respective one of the seats 20, then the articulate angle α increases.

Referring specifically to FIG. 2, when in the deployed position the energy absorption member 40 fills a volume of space behind a back surface 46 of the seat 20 to absorb energy that would otherwise be imparted towards the occupant of the seat 20. For example, if the seat 20 is in the rearward facing configuration, then an outermost surface 50 of the instrument panel or bulkhead 14 may create a barrier once the energy absorption member 40 has deployed. Therefore, the specific amount of volume of space occupied by the energy absorption member 40 in the deployed position may be limited by the instrument panel or bulkhead 14. As such, the expansion device 32 (FIG. 3) would limit the amount of expansion the energy absorption member 40 undergoes to accommodate the instrument panel or bulkhead 14. The deployed energy absorption material is configured to reduce the displacement and acceleration of an occupant within the seat 20 during impact.

In one embodiment, the energy absorption member 40 is an airbag that is constructed of a plurality of panels that are joined together. For example, the panels may include an inboard panel and outboard panel that are coupled together. In one exemplary embodiment, the inboard panel and the outboard panel are constructed of a fabric such as, for example, nylon. The inboard panel and the outboard panel may be sewn to one another or secured by other joining techniques such as, for example, thermobonding. In one embodiment, the airbag may be divided into two or more compartments that are fluidly connected to one another.

In an alternative embodiment, the energy absorption member 40 is a compressible energy absorption material that fits within the energy absorption module 22 when in the stowed position and is configured to expand into the deployed position as shown in FIG. 3. The compressible energy absorption material may be, for example, a compressible foam or an energy absorption structure. Some examples of the compressible energy absorption material include, but are not limited to, foam, aluminum, or plastic. In an embodiment the compressible energy absorption material includes a honeycomb structure. The compressible energy absorption material is configured to expand into the deployed position seen in FIG. 2 within less than about 50 milliseconds if the vehicle 10 does not include a pre-crash system, and less than about 2 seconds if the vehicle 10 includes a pre-crash system. In an embodiment, the compressible energy absorption material supports force deflection up to about 35 kilonewtons.

Referring specifically to FIG. 2, the energy absorption member 40 may include one or more elongated positioning mechanisms, which are referred to as tethers 60. In the alternative, one or more vents configured to release internal pressure may be used. The one or more tethers 60 are disposed either internally or externally with respect to the energy absorption member 40. The one or more tethers 60 position the energy absorption member 40 into the deployed position as the energy absorption member 40 expands from the stowed position (FIG. 1) and into the deployed position, where the control module 30 may determine the specific size and shape of the expanded energy absorption member 40 based on occupant size, severity of the impact, the orientation and magnitude of the impact, and the specific orientation of the seat 20. For example, the tethers 60 position the energy absorption member 40 based on the orientation and the articulate angle of the corresponding seat 20. For example, the tethers 60 position the energy absorption member 40 in a different arrangement in the side-facing when compared to the rearward orientation of the seat 20. Moreover, the tether 60 would adjust the position of the energy absorption member 40 differently if the corresponding seat 20 were in a fully articulated position when compared to a fully upright position. After inflation, the tethers 60 may enhance or improve the strength and rigidity of the energy absorption member 40.

It is to be appreciated that the restraint system 26 may be tuned in a variety of different ways based on the size of the occupant in the seat 20. More specifically, properties of the energy absorption member 40 such as stiffness, flexibility, compression, and volume occupied when in the deployed position are variable and depend upon various characteristics of an occupant. For example, an occupant's size and weight may influence the specific volume that the energy absorption member 40 occupies in the deployed position to support occupant size and kinematics.

In some instances, the energy absorption member 40 remains in the stowed position as the vehicle 10 undergoes an impact. Instead, another airbag or multiple airbags within the vehicle 10 (not shown in the figures) may deploy instead. In other words, the control module 30 determines that the energy absorption member 40 does not expand from the stowed position seen in FIG. 1 and into the deployed position shown in FIG. 2, and instead remains in the showed position. The control module 30 determines the energy absorption member 40 expands from the stowed position and into the deployed position based on the type of impact the vehicle 10 is undergoing as well as the orientation of the seat 20.

Referring now to FIGS. 1, 2, 3, and 6A-6D, if the vehicle 10 is involved in a front or rear impact, then the energy absorption member 40 would deploy when the driver's side seat is in either the forward-facing orientation (FIG. 6A) or the rearward facing orientation (FIG. 6D), but not in either side-facing orientations (FIGS. 6B and 6C). If the vehicle 10 is involved in a side impact, then the energy absorption member 40 would expand into the deployed position if the driver's side seat 20A is in either side-facing orientations, but not the forward-facing orientation or the rearward facing orientation in FIGS. 6A and 6D. If the vehicle 10 is involved in an angular impact, then the energy absorption member 40 expands into deployed position regardless of the orientation of the driver's side seat 20A. It is to be appreciated that while the driver's side seat 20A is described, the same logic may also be applied to the passenger's side seat 20B as well, or any of the remaining seats 20 in the vehicle 10.

Referring to FIGS. 7A-7D, the specific orientation of the driver's side seat 20A is a particular angled orientation that is selected from the plurality of angular orientations. For example, the particular angled orientation of the driver's side seat 20A shown in FIG. 7A is about thirty degrees inboard from the rearward facing orientation Therefore, the seating position detector 36 generates a seat signal that indicates the orientation of the driver's side seat 20A is the particular angled orientation of about thirty degrees inboard from the rearward facing orientation. The control module 30 receives the seat signal, and determines if or when the energy absorption member 40 expands into the deployed position in response to receiving and processing the impact signal from the impact sensing device 34, regardless of the type of impact that the vehicle 10 is involved in. In other words, the energy absorption member 40 expands into the deployed position if the vehicle 10 is involved in a front or rear impact, side impact, or angular impact and it is determined that the energy absorption member 40 deploys.

Figure 4:
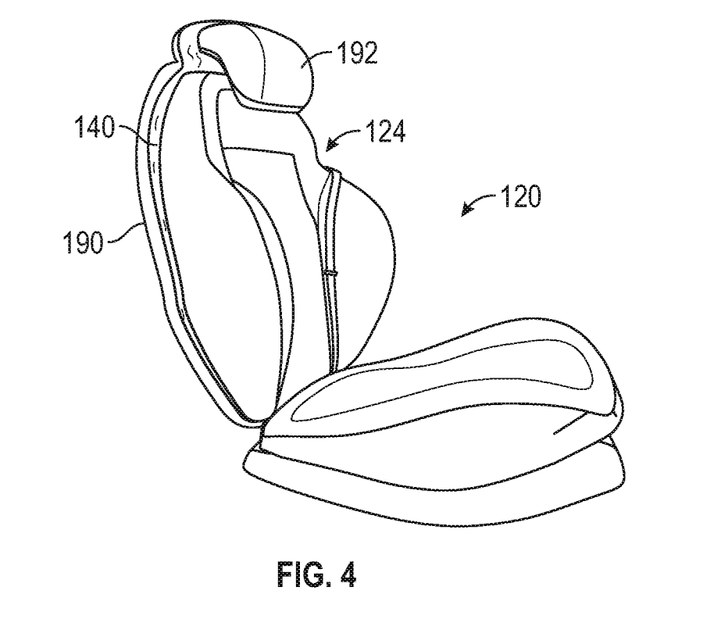
FIG. 4 is an alternative embodiment of the energy absorption member, where the energy absorption module is in the stowed position according to an exemplary embodiment.
Figure 5:
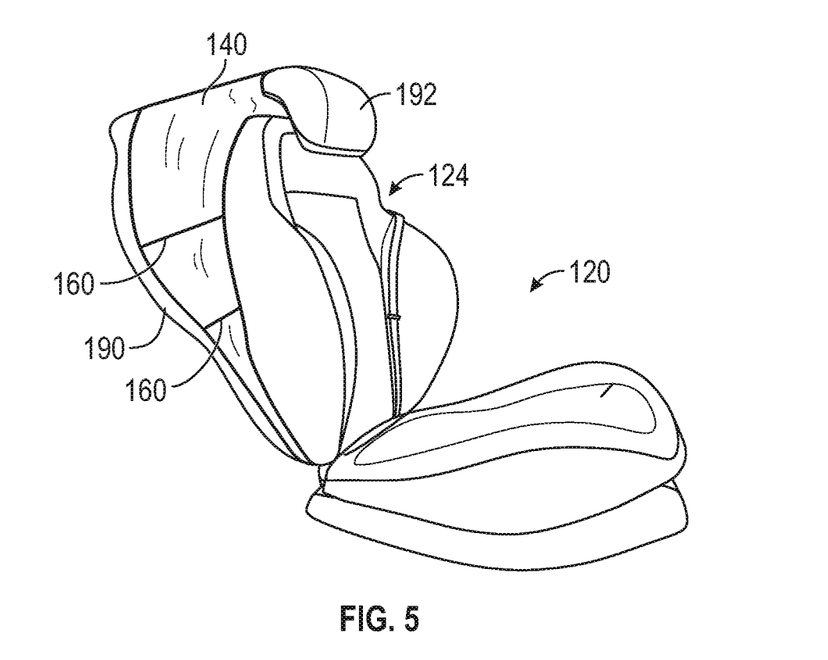
FIG. 5 is an alternative embodiment of the energy absorption member in the deployed position according to an exemplary embodiment.

FIGS. 4 and 5 illustrate an alternative embodiment of the vehicle seats 120 with an energy absorption member 140. In the embodiment as shown, the energy absorption member 140 is constructed of the compressible energy absorbing material. However, in an alternative embodiment, the energy absorption member 140 is an airbag instead. Moreover, the compressible energy absorbing material is disposed along a seat back 124, between a seat shell 190 and a seat back cushion 192. When the energy absorption member 140 is in the stowed position seen in FIG. 4, the compressible energy absorbing material is remains in a compressed configuration. Once the energy absorption member 40 is expanded into the deployed position as seen in FIG. 5, then the seat shell 190 is articulated to accommodate the volume of space behind the seat back that the deployed energy absorption member 140 now fills.

Referring to both FIGS. 4 and 5, although the seat shell 190 articulates as the energy absorption member 40 is expanded, the seat back cushion 192 does not articulate as well. Instead, the compressible energy absorption is expanded to fill the volume of space between the seat shell 190 and the seat back cushion 192. In an embodiment, the energy absorption member 140 also includes one or more tethers 160 (FIG. 5) that position the energy absorption member 140 into the deployed position.

Referring generally to the figures, the disclosure restraint system offers various technical effects and benefits. Specifically, the disclosed energy absorption member accommodates flexible seating arrangements in a vehicle. For example, the flexible seating arrangements may allow for the seat to rotate into a forward-facing, side-facing, or rearward facing orientation. The disclosed energy absorption member accommodates an occupant in any of the seating orientations. The restraint system also takes the orientation or type of impact that the vehicle undergoes into account as well. Finally, one or more tethers may be used to position the energy absorption member into the deployed position as the energy absorption member expands from the stowed position and into the deployed position, where the specific size and shape of the expanded energy absorption material is based on occupant size, severity of the impact, the orientation and magnitude of the impact, and the specific orientation of the seat.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A restraint system for a vehicle, the restraint system comprising:
   a seat shaped to accommodate an occupant, wherein the seat includes a seat back;
   an energy absorption member that expands from a stowed position and into a deployed position, wherein the energy absorption member fills a volume of space behind the seat back when in the deployed position to absorb energy that would otherwise be imparted towards the occupant of the seat during an impact involving the vehicle, wherein the energy absorption member has variable properties including stiffness, flexibility, compression and volume occupied in the deployed position based on occupant characteristics including size and weight to control occupant kinematics in the seat during impact;
   an impact sensing device generating an impact signal in response to detecting the impact involving the vehicle is imminent, wherein the impact signal indicates an orientation and magnitude the impact involving the vehicle; and
   a control module in electronic communication with the energy absorption member and the impact sensing device, wherein the control module executes instructions to:
      receive the impact signal;
      determine that the energy absorption member is to expand based on the orientation and the magnitude of the impact involving the vehicle; and
      instruct the energy absorption member to expand into the deployed position,
   wherein the energy absorption member includes one or more tethers variably adapted to position the energy absorption member based on an orientation and an articulate angle of the seat,
   wherein the control module controls the tether to enhance rigidity of the energy absorption member after inflation based on orientation and magnitude of the impact.

2. The restraint system of claim 1, wherein the seat is moveable between a plurality of orientations that include a forward-facing orientation, a side-facing orientation, and a rearward facing orientation.

3. The restraint system of claim 2, wherein the plurality of orientations of the seat include a plurality of angular orientations that are each located incrementally between the forward-facing orientation and the rearward facing orientation.

4. The restraint system of claim 3, further comprising a seating position detector generating a seat signal indicating a selected orientation of the seat, and wherein the control module is in electronic communication with the seating position detector.

5. The restraint system of claim 4, wherein the orientation of the impact involving the vehicle is one of a front impact, rear impact, a side impact, and an angular impact.

6. The restraint system of claim 5, wherein the control module executes instructions to:
   determine the orientation and the magnitude of the impact involving the vehicle based on the impact signal;
   determine a specific orientation of the seat based on the seat signal; and
   in response to determining the orientation and the magnitude of the impact involving the vehicle and the specific orientation of the seat, determine the energy absorption member remains in the stowed position.

7. The restraint system of claim 5, wherein the control module executes instructions to:
   determine a specific orientation of the seat is a selected angled orientation of the plurality of angular orientations that are each located incrementally between the forward-facing orientation and the rearward facing orientation; and in response to determining the specific orientation of the seat is the selected angled orientation, determine the energy absorption member expands into the deployed position in response to receiving the impact signal.

8. The restraint system of claim 1, further comprising an expansion device operably connected to the energy absorption member, wherein the expansion device expands the energy absorption member from the stowed position into the deployed position.

9. The restraint system of claim 8, wherein the energy absorption member is an airbag.

10. The restraint system of claim 9, wherein the expansion device is an inflation device that generates gas at a predefined volumetric flow rate to inflate the airbag from the stowed position shown in and into the deployed position.

11. The restraint system of claim 1, wherein the energy absorption member is a compressible energy absorption material that supports force deflection up to about 35 kilonewtons.

12. The restraint system of claim 1, wherein the seat includes a seat shell and a seat back cushion, and wherein the energy absorption member is disposed between the seat shell and the seat back cushion.

13. A vehicle, comprising:
a seat shaped to accommodate an occupant, wherein the seat includes a seat back, and wherein the seat is moveable between a plurality of orientations that include a forward-facing orientation, a side-facing orientation, and a rearward facing orientation an energy absorption member that expands from a stowed position and into a deployed position, wherein the energy absorption member fills a volume of space behind the seat back when in the deployed position to absorb energy that would otherwise be imparted towards the seat during an impact involving the vehicle, wherein the energy absorption member has variable properties including stiffness, flexibility, compression and volume occupied in the deployed position based on occupant characteristics including size and weight to control occupant kinematics in the seat during impact;
an impact sensing device generating an impact signal in response to detecting the impact involving the vehicle is imminent, wherein the impact signal indicates an orientation and magnitude of the impact involving the vehicle;
a seating position detector generating a seat signal indicating a selected orientation of the seat; and
a control module in electronic communication with the energy absorption member, the seating position detector, and the impact sensing device, wherein the control module executes instructions to:

receive the impact signal;
determine the orientation and the magnitude of the impact involving the vehicle based on the impact signal;
determine a specific orientation of the seat based on the seat signal; and
in response to determining the orientation and the magnitude of the impact involving the vehicle and the specific orientation of the seat, instruct the energy absorption member to expand into the deployed position,
wherein the energy absorption member includes one or more tethers variably adapted to position the energy absorption member based on an orientation and an articulate angle of the seat,
wherein the control module controls the tether to enhance rigidity of the energy absorption member after inflation based on orientation and magnitude of the impact.

14. The vehicle of claim 13, wherein the orientation of the impact involving the vehicle is one of a front impact, rear impact, a side impact, and an angular impact.

15. The vehicle of claim 14, wherein the control module executes instructions to:
determine the orientation and the magnitude of the impact involving the vehicle based on the impact signal;
determine the specific orientation of the seat based on the seat signal; and
in response to determining the orientation and the magnitude of the impact involving the vehicle and the specific orientation of the seat, determine the energy absorption member remains in the stowed position.

16. The vehicle of claim 14, wherein the control module executes instructions to:
determine the specific orientation of the seat is a selected angled orientation of a plurality of angular orientations that are each located incrementally between the forward-facing orientation and the rearward facing orientation; and
in response to determining the specific orientation of the seat is the selected angled orientation, determine the energy absorption member expands into the deployed position in response to receiving the impact signal.

17. The vehicle of claim 13, wherein the energy absorption member is an airbag.

18. The vehicle of claim 13, wherein the energy absorption member is a compressible energy absorption material that supports force deflection up to about 35 kilonewtons.

19. The vehicle of claim 13, wherein the seat includes a seat shell and a seat back cushion, and wherein the energy absorption member is disposed between the seat shell and the seat back cushion.

* * * * *